Nov. 27, 1956　　　K. DAWKINS ET AL　　　2,772,385
BATTERY CHARGER FOR A PLURALITY OF SETS
OF SERIES CONNECTED BATTERIES
Filed July 17, 1953
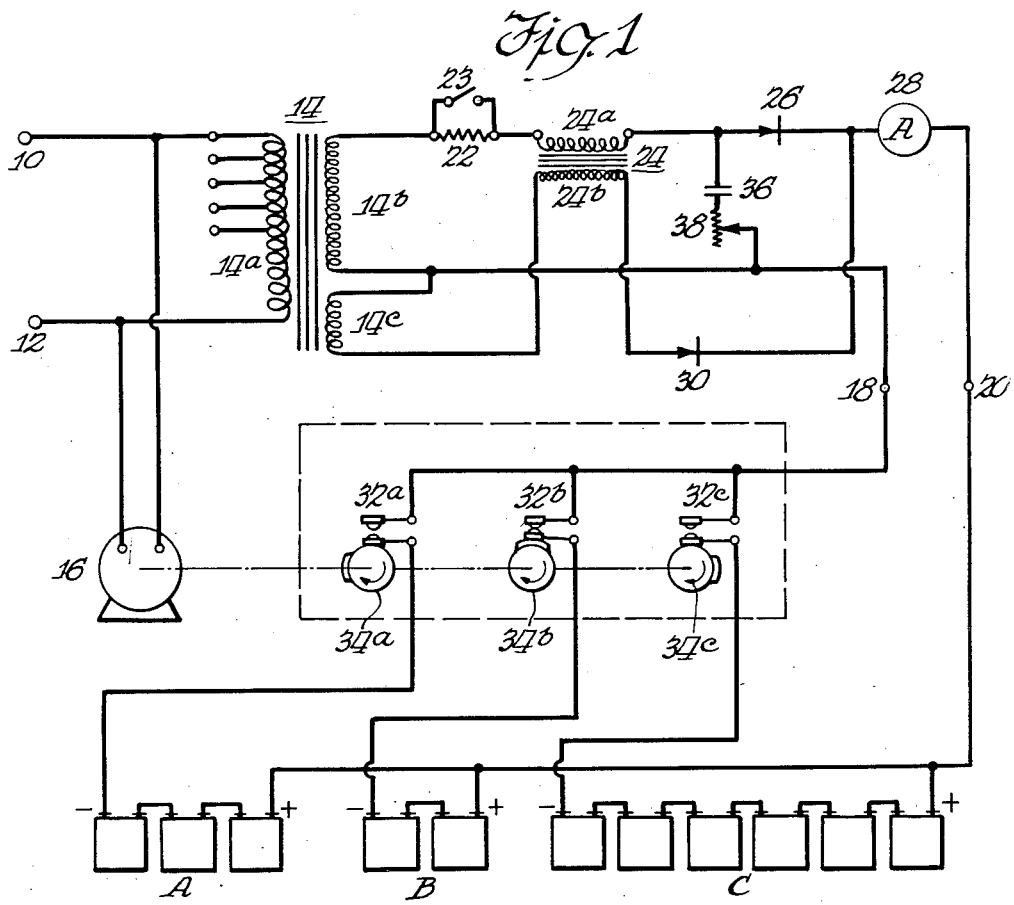
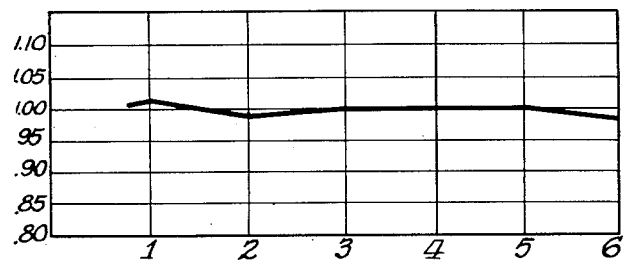
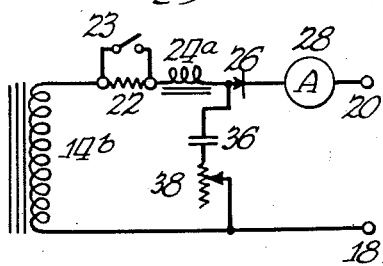
Inventors
Kenneth Dawkins
Elmer J. Peterson
by Bair, Freeman & Molinare
Attys.

United States Patent Office 2,772,385
Patented Nov. 27, 1956

2,772,385

BATTERY CHARGER FOR A PLURALITY OF SETS OF SERIES CONNECTED BATTERIES

Kenneth Dawkins and Elmer Joule Peterson, Minneapolis, Minn., assignors to Franklin Manufacturing Company, Inc., Minneapolis, Minn., a corporation of Minnesota Application July 17, 1953, Serial No. 368,642

6 Claims. (Cl. 320—18)

This invention relates to an improved battery charger capable of maintaining the charge on each of a plurality of sets of series connected batteries despite variations in the number of batteries in the various sets, variations in temperature, or variations in battery size.

Batteries discharge when in storage because of the so-called "internal discharge" resulting from chemical action in the cells, which chemical action varies with the temperature of the cells but is relatively independent of the size of the cells. This effect requires that some means be used to compensate or recharge the batteries, taking into account the size and temperature of the cells. In one present method this end is partially accomplished by giving batteries a continuous low rate charge, known as a "trickle charge." While apparatus for accomplishing this type of charge is comparatively simple, it does not compensate for battery size or temperature. There is serious doubt at the present time whether the practice of disregarding temperature and size is compatible with good battery life expectancy.

Another way to replace the charge lost by batteries in storage is by charging at a substantial amperage for short times periodically. This arrangement is considered most advantageous from the standpoint of battery life but has heretofore entailed manual testing and manual charging control.

In accordance with the present invention, improved mechanism is provided to charge batteries periodically in proportion to size and temperature. This system is capable of maintaining a relatively constant current over a wide range of voltages. Since the amount of charge put in to a battery is equal to the current times the time, then the amount of charge can be controlled by varying the time, the current being constant for any number of cells. For temperature compensation in the regulated value of the current is varied. Briefly, the charging voltage is derived from a transformer having two secondaries, one to provide charging power and one to supply a charging control voltage. In series with the power coil of the transformer is a reactor having a secondary winding which in conjunction with the control voltage and a rectifier serves to modulate the current flow in the charging circuit with respect to the terminal voltage or battery voltage. The power and control circuits are connected to common output terminals across which the separate sets of series connected batteries are applied in sequence by sequentially operated switches having different time periods of closure. The control winding on the power transformer and the secondary on the reactor are so designed that the voltages thereacross are approximately equal and 180° out of phase with each other for cancelling the voltage induced in the reactor secondary winding, when no battery voltage is applied to the charging circuit or under open circuit conditions. This effect may be achieved by reverse winding and serves to provide a no load balanced A. C. circuit. Since the current flow in the control circuit is through a rectifier, the resultant flow will be unidirectional and of a pulsating nature, the average value of which is a function of the battery voltage since this voltage will appear as an unbalance in the otherwise balanced A. C. circuit. This pulsating control current flow serves to supply the proper amount of flux in the reactor steel to allow a controlled counter e. m. f. to appear in the primary coil of the reactor. With the control circuit open, the circuit becomes a self-saturated half wave reactor. If desired, a capacitor-resistance network may be added to improve the performance by drawing an additional current pulse in phase with the control pulse which is again a function of the battery voltage, since on one-half of the wave the capacitor is charged to the battery voltage. An alternative embodiment of the circuit employs only the capacitor and resistance network.

It is accordingly the object of the present invention to provide an improved, simple, battery charger capable of charging a metered amount of energy into a multiplicity of series connected groups of batteries, the charger being characterized by simplicity of construction, uniformity of charging current despite great variations in the number of batteries in the respective sets, ability to operate effectively with batteries of different sizes and ability to compensate for variations in ambient temperature.

Further, it is an object of the present invention to provide an improved constant current rectifying circuit.

Another object of the present invention is to provide an improved constant current rectifying circuit wherein a magnetic core is magnetized during non-conducting half cycles to an extent tending to maintain constant average current flow during conducting half cycles.

The novel features which we believe to be characteristic of our invention are set forth with particularity in the appended claims. Our invention itself, however, both as to its organization and method of operation, together with further objects and advantages thereof, will best be understood by reference to the following description taken in connection with the accompanying drawings, in which:

Figure 1 is a circuit diagram of a battery charger constructed in accordance with the present invention;

Figure 2 is a chart showing the constancy of charging current through a range of the number of series connected batteries; and Figure 3 is a fragmentary circuit diagram of an alternative circuit constructed in accordance with the present invention.

Referring now to Figure 1, there are shown at 10 and 12 a pair of terminals which are connected to a source of alternating voltage by suitable means (not shown). this source may, for example, be 115 volts, 60 cycles. The primary winding 14a of the transformer 14 is connected to these terminals as is the cam-driving clock motor 16.

Secondary winding 14b of the transformer 14 energizes the main battery charging circuit which charges the batteries through the terminals 18–20. This circuit may be traced from winding 14b through resistance 22, winding 24a of the reactor 24, rectifier 26, and ammeter 28 to the terminal 20 and from terminal 18 direct to the winding 14b. The effect of this circuit is to charge the batteries in current pulses derived from the positive half cycles of voltage of the winding 14b as rectified and modified by resistance 22 and the winding 24a, as further described hereafter.

The control circuit is energized by the winding 14c and may be traced from winding 14c through the winding 24b of the reactor 24, rectifier 30, and ammeter 28 to the terminal 20 and from terminal 18 back to the winding 14c. This circuit acts primarily as a control circuit to regulate the effective voltage of the primary energizing circuit to maintain a substantially constant total charging current as hereinafter described in detail.

The batteries to be charged are connected in a plurality of sets, the batteries of each set being connected in series. Three such sets are shown at A, B, and C, Figure 1, by way of illustration, although in practice a much greater number of sets is preferably used. The sets of batteries A, B, and C are connected to the terminals 18–20 by the switches 32a, 32b, and 32c, respectively. If the unit is intended for a greater number of sets of batteries, a corresponding number of switches is used.

The switches 32a, 32b, and 32c are periodically closed in sequence by the cams 34a, 34b, and 34c, respectively. These cams are mounted on a common shaft driven by the motor 16 and have radially enlarged switch closing portions which engage the switches respectively to close the same, as shown diagrammatically in Figure 1. The shaft of motor 16 rotates at a uniform angular velocity, thus assuring that each switch is held closed for a uniform predetermined time.

The charger may be arranged to charge various sets of batteries for different lengths of time in accord with the cell capacities. The radially enlarged portions of the various cams may be given different circumferential extents to close the corresponding switches for the different periods of time required to effect this end. The timer or clock motor 16 rotates at uniform velocity.

The circuit of Figure 1 is adapted to charge a plurality of sets of batteries connected in sequence thereto by an output current which remains relatively constant despite large variations in the sizes and voltage ratings of the batteries in each set. Thus, as each set of batteries of different voltage rating is connected to the charging circuit, the voltage output of the latter must be adjusted in accordance therewith to maintain the charge current at substantially the desired constant value. The circuit should be considered as comprising two related but separate circuits connected in parallel to the load batteries. The first, or power circuit, comprises transformer secondary winding 14b, resistance 22, power winding 24a of reactor 24, rectifier 26, and ammeter 28. The second, or control circuit, comprises transformer secondary winding 14c, control winding 24b of reactor 24, rectifier 30, and ammeter 28. The capacitor 36 and the variable resistance 38 provide an additional control which is explained hereafter.

Secondary windings 14b and 14c are connected so that the voltages induced thereacross by transformer action from primary winding 14a are 180° out of phase with each other and thereby cause the two circuits to be alternatively conducting. Thus during one-half cycle of the input A. C. voltage the control circuit will be operative and the power circuit will be blocked by reverse potential at its rectifier 26, and, conversely, during the other half cycle of the input A. C. voltage the power circuit will be operative and the control circuit will be blocked by reverse potential at its rectifier 30.

Assume, as shown in Figure 1, that the load on the charging circuit changes by action of the cam switches from battery set C of comparatively large voltage rating to battery set B of smaller voltage rating to thereby cause greater unbalance in the charging circuit. During the control half cycle of operation a pulse of current is caused to flow in the control circuit through rectifier 30, reactor winding 24b, and transformer secondary winding 14c, which current has an amplitude corresponding to the instantaneous voltage difference between the control circuit output voltage and the battery voltage. In this manner the magnitude of the flux generated in the saturable core reactor 24 by the flow of the control current, is a function of the battery voltage. As above explained, the control pulse flux is of such phase relation to the conducting period of the power circuit that varying amounts of flux are generated in the reactor during the one-half cycle preceding the power half cycle.

By transformer action during the power half cycle of operation, this flux as it collapses induces a voltage in power winding 24a of the reactor in such a direction that the voltage of secondary winding 14b is opposed. This results in a reduced A. C. voltage at rectifier 26 and consequently a reduced charging circuit D. C. output to compensate for the reduced voltage of battery set B. Hence, a lower D. C. voltage at the battery increases the magnitude of the flux pulse put into the reactor and results in a decreased voltage output of the power circuit to maintain a constant average current flow to the batteries.

In a similar manner, a change in load from battery set B to battery set A of higher voltage rating causes a smaller current to flow in reactor winding 24b during the control half cycle since the unbalance is not as great as in the above-described illustration. This current flow serves to induce a lesser voltage in reactor winding 24a which opposes secondary winding 14b only sufficiently to reduce the A. C. voltage at rectifier 26, and hence the charge circuit D. C. voltage output, to that required to maintain the desired constant average current flow to the batteries.

Advantageously, the reactor winding 24b and secondary winding 14c of the control circuit are designed so that the voltage across winding 14c is equal to and 180° out of phase with the voltage induced in winding 24b, by the collapse of flux in winding 24a. In this manner the control circuit initially is balanced and the battery voltage, during operation, appears as an unbalance in an otherwise balanced A. C. circuit.

Capacitor 36 and variable resistance 38 serve to provide additional control action over the charging current in the following manner. During the power circuit half cycle of operation rectifier 26 is in its low impedance or conducting condition and condenser 36 charges to a voltage determined by the voltage supplied to the battery which is limited by the battery voltage if the battery has the usual low internal resistance, and the windings 14b and 24a have a relatively high impedance. During the control half cycle of operation, rectifier 26 is blocked and condenser 36 discharges to cause current to flow through reactor winding 24a and thereby generate a flux pulse in the reactor of magnitude corresponding to the current. This flux pulse acts during the subsequent power half cycle to induce a voltage in reactor winding 24a in opposition to the voltage of winding 14b and thereby tends to maintain a constant average charging current flow despite variations in battery voltage.

The resistor 22 is shunted by a thermostatically controlled switch 23. This switch opens below a predetermined temperature to reduce the charging rate and thus compensate for the lower internal discharge rates as temperature drops. If desired, a plurality of steps of compensation, each controlled by an appropriate thermostatic switch, may be provided.

Figure 2 shows the current flow, as measured by a D.-C. D'Arsonval type ammeter, to the batteries with the circuit of Figure 1. It will be noted that the current flow is constant within a range of a few percent from one battery (6 volts) to six batteries (36 volts). This uniformity assures that all batteries are charged uniformly, regardless of the number of series connected batteries in each set.

In the apparatus which produced the current flow of Figure 2, the following characteristics were used:

Winding 14b___ 243 turns, 144 volts R. M. S. open circuit.
Winding 14c___ 130 turns, 72 volts R. M. S. open circuit.
Resistance 22___ 16 ohms.
Winding 24a___ 300 turns.
Winding 24b___ 600 turns.
Capacitor 36___ 1 mf.
Resistance 38___ 1500 ohms, variable.

Measured voltages and current during normal operation were as follows:

| Voltages Across— | Open Cir. | Short Cir. | Number of Batteries in Series | | | | | |
|---|---|---|---|---|---|---|---|---|
| | | | 1 | 2 | 3 | 4 | 5 | 6 |
| Winding 14b (R. M. S.) | 138 | 132 | 145 | 145 | 145 | 144 | 144 | 144 |
| Winding 24a (R. M. S.) | 86 | 130 | 125 | 122 | 119 | 117 | 115 | 112 |
| Rectifier 26 (R. M. S.) | 100 | 12.5 | 22 | 30 | 37 | 44 | 50 | 58 |
| Rectifier 30 (R. M. S.) | 102 | 10 | 14 | 18 | 22 | 25 | 29 | 32 |
| Resistance 38 (R. M. S.) | 72 | 9 | 11 | 14 | 17 | 21 | 25 | 28 |
| Capacitor 36 (R. M. S.) | 105 | 40 | 16 | 22 | 28 | 34 | 40 | 42 |
| Terminals 18-20 (avg. volts) | 90 | 0 | 7.6 | 14.5 | 21.5 | 28 | 35 | 41.5 |
| Winding 14c (milliamps, avg.) | −3 | 160 | 100 | 66 | 44 | 31 | 23 | 17 |
| Ammeter 28 (amps., avg.) | 0 | 1.10 | 1.02 | .99 | .98 | .99 | 1.01 | .99 |

If desired, the secondary or control charging circuit may be omitted. In this instance, the capacitor 36 acts to condition the core upon which winding 24a is wound and thereby maintain the desired constant current, although somewhat less effectively than when the secondary charging circuit is provided. Figure 3 shows a circuit of this type, using the same reference numerals as are above identified with respect to Figure 1.

Figure 3 shows a variation of the circuit using only the capacitor-resistance circuit for control. In this case the reactor control pulse comes from the capacitor on the blocking one-half cycle of the rectifier. The charge on condenser 36 in the forward direction is only as high as the battery voltage, hence a change in battery voltage changes the charging on the condenser during this part of the cycle. On the blocking one-half cycle, the charge on the condenser affects the flow of current through the reactor which is controlling the current flow to the rectifier on the forward one-half cycle. This action causes a flux wave in the reactor which induces a varying voltage in the reactor coil, opposing the voltage of winding 14b and controlling the flow of current.

In an actual unit omitting the secondary charging circuit, the following performance was achieved. In this instance the values of the components were the same as above listed except that the winding 24a was 800 turns and winding 14b 214 turns.

| Voltages Across— | Open Cir. | Short Cir. | Number of Batteries in Series | | | | | |
|---|---|---|---|---|---|---|---|---|
| | | | 1 | 2 | 3 | 4 | 5 | 6 |
| Winding 14b (R. M. S.) | 100 | 74 | 76 | 76 | 76 | 76 | 76 | 75 |
| Winding 24a (R. M. S.) | 90 | 74 | 80 | 84 | 86 | 88 | 90 | 91 |
| Rectifier 26 (R. M. S.) | 0 | 13 | 20 | 28 | 38 | 47 | 58 | 68 |
| Capacitor 36 (R. M. S.) | 165 | 14 | 20 | 29 | 38 | 47 | 58 | 67 |
| Resistance 38 (R. M. S.) | 18.5 | 2 | 3 | 4 | 5 | 6 | 6.8 | 7.6 |
| Terminals 18-20 (avg. volts) | 3 | 0 | 7.6 | 15 | 22 | 27 | 35.5 | 42 |
| Terminals 18-20 (R. M. S. volts) | 180 | 0 | | | | | | |
| Ammeter 28 (amps., avg.) | 0 | 1.06 | .97 | .96 | .99 | 1.02 | 1.03 | 1.01 |

While we have shown and described specific embodiments of the present invention, it will, of course, be understood that further modifications and alternative constructions may be made without departing from the true spirit and scope thereof. We, therefore, intend by the appended claims to cover all modifications and alternative constructions falling within the true spirit and scope thereof.

What we claim as new and desire to secure by Letters Patent of the United States is:

1. A battery charger adapted to maintain the charge on all of a plurality of sets of series connected batteries in which the number of batteries in each set varies, the charger comprising: a pair of circuits each comprising a source of alternating voltage and a rectifier in series connection, each source being of like frequency and phase with the other, the circuits being connected in parallel relation to define common output terminals; means defining series circuit from said common output terminals to the sets of batteries, respectively; switches interposed between said common output terminals and the said last means, respectively; means to actuate said switches to close said series circuits singly and in sequence; and a reactor having a core, one winding connected in one of said energizing circuits, and another winding connected in the other energizing circuit in opposed relationship with respect to the direction of rectifier current flow, said windings being so proportioned in relation to each other and to the internal impedances in the respective energizing circuits as to cause current flow in one of the circuits of timing and magnitude to vary the magnetic condition of the reactor core in a manner tending to maintain constant average charging current contributed by the other.

2. A battery charger adapted to maintain the charge on all of a plurality of sets of series connected batteries in which the number of batteries in each set varies, the charger comprising: a pair of circuits each comprising a source of alternating voltage and a rectifier in series connection, each source being of like frequency and phase with the other, the circuits being connected in parallel relation to define common output terminals; means defining series circuits from said common output terminals to the sets of batteries, respectively; switches interposed between said common output terminals and the said last means, respectively; means to actuate said switches to close said series circuits singly and in sequence; a reactor having a core, one winding connected in one of said energizing circuits, and another winding connected in the other energizing circuit in opposed relationship with respect to the direction of rectifier current flow, said windings being so proportioned in relation to each other and to the internal impedances in the respective energizing circuits as to cause current flow in one of the circuits of timing and magnitude to vary the magnetic condition of the reactor core in a manner tending to maintain constant average charging current contributed by the other, and a capacitor connected in shunting relation to the rectifier in said one circuit.

3. A battery charger adapted to maintain the charge on all of a plurality of sets of series connected batteries in which the number of batteries in each set varies, the charger comprising: an energizing circuit comprising a source of alternating voltage, a resistance, and a rectifier in series connection; a control circuit comprising a second source of alternating voltage and a rectifier in series connection, the second source of voltage being of like frequency with the first mentioned source and having approximately half the voltage of the first mentioned source; means connecting the circuits in parallel relation to define common output terminals; means defining series circuits from said common output terminals to the sets of batteries, respectively; switches interposed between said common output terminals and the said last means, respectively; means to actuate said switches to close said series circuits singly and in sequence; a reactor having a core and a pair of windings, one winding having approximately twice the turns of the other winding; means connecting said one winding in the control circuit and the said other winding in the energizing circuit, the windings being connected in bucking relationship with respect to the directions of rectifier current flow and being constructed to cause current flow in the control circuit through the reactor of amount tending to maintain a constant average current through the energizing circuit; and temperature actuated switch means operable to shunt the resistance when predetermined temperature is exceeded.

4. A constant current charging circuit for various numbers of series connected batteries comprising in combination: a main charging circuit and a control charging circuit, each comprising a source of alternating voltage and a rectifier in series connection, each source being of like frequency and phase with the other, the circuits being connected in parallel relation to define common output terminals adapted to receive batteries for charging; and a reactor having one winding connected in one of said charging circuits and another winding connected in the other charging circuit in opposed relationship with respect to the direction of rectifier current flow, the windings being constructed to cause current flow in the control charging circuit through the reactor of amount tending to maintain a constant average current through the main charging circuit.

5. A constant current charging circuit for various numbers of series connected batteries comprising in combination: a main charging circuit and a control charging circuit, each comprising a source of alternating voltage and a rectifier in series connection, each source being of like frequency and phase with the other, the circuits being connected in parallel relation to define common output terminals adapted to receive batteries for charging; and a reactor having one winding connected in one of said charging circuits and another winding connected in the other charging circuit in opposed relationship with respect to the direction of rectifier current flow, the windings being constructed to cause current flow in the control charging circuit through the reactor of amount tending to maintain a constant average current through the main charging circuit; and a capacitor connected in shunting relation to the rectifier in the main charging circuit.

6. A constant current charging circuit for various numbers of series connected batteries comprising in combination: a source of alternating voltage; a reactor having a magnetic core and a winding; a rectifier; means defining output terminals; means connecting the source, reactor and rectifier in series relation to said output terminals; and a capacitor connected in shunting relation to the rectifier, the magnetic characteristics of the reactor being such that current flow therethrough while the rectifier is non-conducting conditions the core to cause a voltage in the winding during the subsequent conducting period of the rectifier of direction and amount to tend to maintain a constant average current flow through the rectifier.

References Cited in the file of this patent
UNITED STATES PATENTS

| Number | Name | Date |
|---|---|---|
| 1,716,798 | Schmidt | June 11, 1929 |
| 1,950,428 | Young | Mar. 13, 1934 |
| 2,322,955 | Perkins | June 29, 1943 |
| 2,418,141 | Salazar | Apr. 1, 1947 |
| 2,423,134 | Winkler | July 1, 1947 |
| 2,490,859 | Dalzell | Feb. 7, 1950 |
| 2,660,702 | Arvidsson | Nov. 24, 1953 |